Sept. 8, 1942.　　　　J. F. SCHOTT　　　　2,295,363

PILLOW

Filed May 17, 1940

Inventor:
John F. Schott
By Eugene M. Giles Atty.

Patented Sept. 8, 1942

2,295,363

UNITED STATES PATENT OFFICE 2,295,363

PILLOW

John F. Schott, Mishawaka, Ind., assignor to Mishawaka Rubber and Woolen Manufacturing Company, Mishawaka, Ind., a corporation of Indiana Application May 17, 1940, Serial No. 335,737

8 Claims. (Cl. 5—337)

This invention relates to spongy rubber cushions, pillows and the like of the character disclosed in the pending application of George W. Blair, Serial No. 309,510 filed December 16, 1939.

Cushions suitable for use as pillows should have not only low density and low supporting power, but also low internal friction and a minimum of surface tension, so that the cushions will be freely yieldable. At the same time such cushions should have the power to restore themselves to their normal uncompressed shapes whenever relieved of a load or stress, yet should have suitable "hysteresis" to insure sufficiently slow and easy response to pressure and relaxation of pressure thereon to obviate objectionable springiness or the tendency to rebound upon relief of pressure.

The principal objects of my invention are to provide an improved cushion suitable for use as a pillow having the desirable and necessary characteristics mentioned above; to make such a cushion of molded foam rubber or latex; to provide for adequate ventilation within the cushion and to construct the interior of the cushion in such a way that any entrapped compressed air may escape freely. Further objects are to provide a pillow which promotes sanitation as it may be washed and sterilized internally as well as externally, which maintains its shape permanently, which does not absorb moisture readily, which is extremely comfortable, and which cannot shed, as feather pillows do.

In the accompanying drawing forming a part of this specification—

Figure 1:
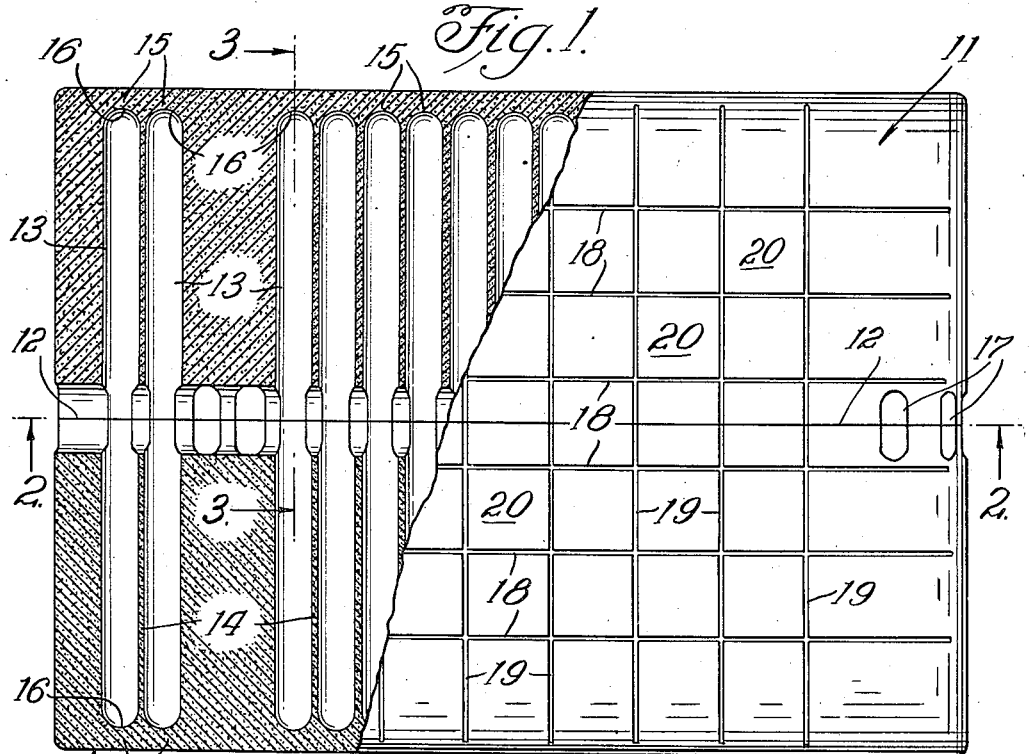
Fig. 1 is a top plan view of a pillow constructed in accordance with my invention.

A cushion embodying the invention is preferably made of foamed or frothed rubber latex which is commonly prepared either by whipping a compounded latex containing a foaming agent into a foam or stirring the compounded latex into a separately prepared foam, the mixture or compound then being molded and vulcanized in the desired shape. In the drawing the cushion is shown as of the conventional pillow shape and is composed of two identical mating half sections 11, each half section being formed from the same mold or from two identical molds (not shown) which are somewhat similar to the mold disclosed in the aforesaid application. The half sections are each made entirely of foamed latex of a very low density, so that the final product is of the desired light weight and soft texture with all its walls having an infinite number of tiny intercommunicating cells which permit air circulation throughout the mass for ventilation, also to contribute to the "hysteresis" properties of the cushion. The two half sections 11 are preferably cemented together along two flat abutted walls 12, and in the embodiment shown, the plane of cementation is the vertical medial longitudinal plane of the pillow.

Each half section 11 is molded with corresponding cored out cylindrical cavities 13 arranged close together in transverse parallel rows, with relatively thin walls 14 intermediate the cylindrical cavities. These cored out cavities 13 are of varying length, depending on their positions and the varying contour of the outer walls of the pillow, so as to extend similarly close to the outer convex surface of a half section 11, leaving a web 15 of substantial thickness beyond the outer or closed end 16 of each cavity 13, said closed ends being preferably rounded as shown. The elongated cavities collectively occupy a large proportion of the interior of the pillow body.

Figure 3:
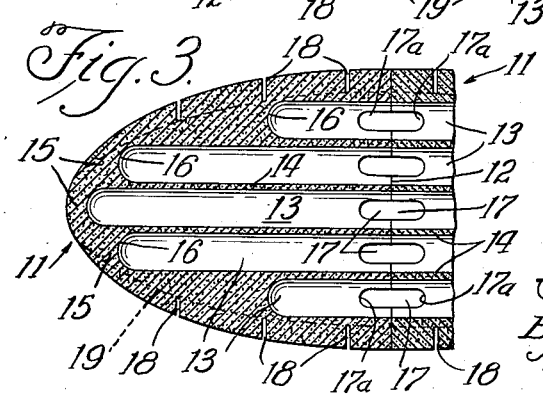
Fig. 3 is a fragmentary vertical cross section on the line 3—3 of Fig. 1.

As shown in Fig. 3, the core cavities 13 of each half section 11 are alined or registered with the corresponding core cavities of the other half section when the flat faces 12 of the two half sections are cemented together, thus providing the assembled cushion with a multiplicity of transverse cylindrical openings extending almost entirely through the cushion but closed at opposite ends, and affording an internal cushion structure of interconnected web-like walls of foam latex. The result is that the cushion has low supporting power with low internal friction and is exceedingly soft and light in weight.

Figure 2:
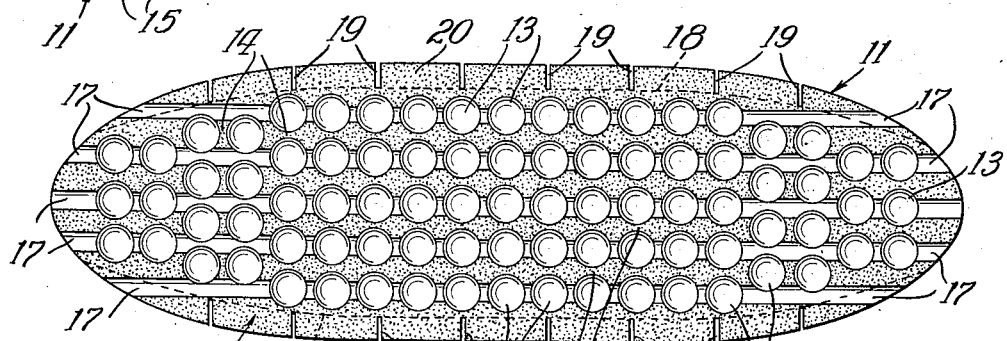
Fig. 2 is a vertical longitudinal section on the line 2—2 of Fig. 1, being also a side elevation of one of the half sections of the pillow.

To obviate air trapping which would retard free compression and expansion and might also impart undesirable springiness, the pillow of my invention is constructed so as to insure free flow of air to and from each of the cavities 13 as the pillow expands and contracts. As shown, channels 17 extend longitudinally of the pillow and out to the ends thereof, each of said channels being open at both ends. Channels 17 are each made up of two mating or registering grooves 17ª molded in the abutted faces 12 of the half sections 11 and as shown, each channel may have a flattened elliptical cross section, with the short axis of the flattened ellipse about one-half the diameter of the cavities 13. Each channel provides an air passageway of substantial capacity communicating with one or more rows of cavities 13, the arrangement being such that each cavity 13 is pierced or intersected by at least one channel 17 and many of the cavities communicate directly with two of the channels as will be observed in Fig. 2. Preferably there is one vertical central row of channels 17 but more than one vertical row may be provided, if desired. As each channel 17 is open at both ends it follows that compression at the center of the pillow will force air out at both ends of the pillow, but if a heavy load should compress one end of the pillow to such an extent as to close and seal one or more channels 17 at that end, the other end of the sealed channel or channels will remain open to exhaust any air under pressure within the pillow. It will also be clear that as the foam rubber of the cushion body is of intercommunicating open cell texture, compression and expansion of the cushion causes movements of ventilating currents not only through cavities 13 and channels 17, but also through the webs and other walls of the foam rubber itself.

To obviate skin tension, which would limit the compressibility of the pillow by creating stresses at and adjacent the surface of the pillow, both sides of the pillow are provided with narrow, spaced, parallel longitudinal slits 18 and similar transverse slits 19, said slits being formed preferably at the time the pillow is molded, although they could be formed after molding by employing knives or saws. Slits 18, 19 are preferably at right angles to the surfaces in which they are formed. The narrowness of the slits is such that the continuity of the surface on either side of the pillow is not appreciably broken, or in other words, when the pillow cushion is covered by a pillow case or other covering (not shown) the pillow feels as though it presented a continuous unbroken surface on either side. The illustrated crisscross arrangement of slits 18, 19 provides a multiplicity of rectangular foam rubber blocks 20 which are joined at their bases with the body of the pillow but at their outer ends are very flexible, being free to move in any direction because of the lack of skin tension and because of the inherent softness of the internal structure of the pillow. The result is that these blocks 20 will separate wherever, due to the configuration of the pillow, there would be a tensioned skin or surface, but they will close the separating slits and lie tightly against each other whenever there is a compression or load on either side of the pillow. Thus to the cheek of the user of the described pillow, the blocks 20 apparently do not exist, and the pillow has a continuous side surface, yet the discontinuity of the pillow sides makes for compressibility and comfort such as no continuous-surfaced pillow would yield. Slits 18, 19 need not run at right angles to form rectangular blocks 20 but may form diamond-shaped blocks (not shown) or blocks of other configurations and any desired spacing of the slits 18 and 19 may be employed.

While the slits 18, 19 are provided primarily for elimination of skin tension, they also play a part in ventilating the pillow since they extend well below the surface of each side of the pillow and thus expose a large number of the tiny intercommunicating cells of the foam rubber. Furthermore when adjacent flexible blocks 20 separate to provide gaping slits 18, 19, as they will whenever there is a stress tending to create a surface or skin tension, the normally closed or nearly closed interiors of the gaping slits are opened for thorough ventilation. Movements of the user of the pillow cause movements of the flexible blocks 20 as well as of the internal structure of the pillow and thus ventilation occurs over the entire pillow face.

It will be understood that the cushion may be made in forms other than those illustrated and described and that the invention or certain features thereof may be employed in other kinds of cushions. Moreover, the cavities 13 need not extend transversely, as they may lie longitudinally, with transverse ventilating channels 17. This will be clear without illustration.

While I have shown and described my invention in a preferred form, I am aware that various changes and modifications may be made therein without departing from the principles of my invention, the scope of which is to be determined from the following claims.

I claim as my invention:

1. A spongy rubber cushion or pillow comprising a body having a plurality of internally located, substantially horizontal, elongated, cylindrical cavities extending transversely of the pillow parallel to each other and separated from each other by thin walls, said cavities having their ends separated by webs from the outside surfaces of the pillow body; said body also having a plurality of parallel, straight, substantially horizontal, ventilating channels arranged one above the other and extending longitudinally of the pillow, each of said channels intersecting all the cavities that lie on its level, and extending out to the ends of the pillow, where the ends of the channel are exposed.

2. The invention according to claim 1, wherein the pillow body is made up of two half sections cemented together along a plane which is the medial vertical longitudinal plane of the pillow body; each of said channels being formed partly in one half section and partly in the other; the cavities being formed of complemental alined cavities each of half the length of the complete cavity and formed in either of the half sections.

3. A pillow comprising a spongy rubber body having a plurality of elongated cavities extending closely adjacent each other and arranged in rows which are horizontal when the pillow is in the normal position of use and having their opposite ends closed, some of said horizontal rows extending above others to provide vertical tiers of said cavities; and ventilating air passageways piercing the walls of each of said cavities and extending to the outer walls of the pillow.

4. The invention according to claim 3 wherein there are narrow slits formed crisscross in the surfaces of the pillow and extending generally at right angles to the sides.

5. A spongy rubber cushion or pillow comprising juxtaposed sections in face to face relation along a median vertical plane, each section having horizontal substantially parallel matching cavities therein extending outwardly from the inner face thereof and terminating short of the side of the section, said sections having horizontal matching channels in their inner faces communicating with said cavities and leading to the exterior of the cushion through an edge thereof.

6. A spongy rubber cushion or pillow comprising juxtaposed sections in face to face relation along a median vertical plane, each section having horizontal substantially parallel matching cavities therein extending outwardly from the inner face thereof and terminating short of the side of the section, said sections having horizontal matching channels in their inner faces communicating with said cavities and leading to the exterior of the cushion through an edge thereof, the surfaces of said cushion being provided with longitudinal and transverse slits of no appreciable width and having their walls substantially abutting so as to not materially interfere with the continuity of said surfaces.

7. A spongy rubber cushion or pillow comprising juxtaposed sections in face to face relation along a median vertical plane, each section having horizontal cavities therein extending outwardly from the inner face thereof and terminating short of the side of the section, said sections having horizontal channels in their inner faces communicating with said cavities and leading to the exterior of the cushion through an edge thereof.

8. A cushion member of the class described, comprising a body of spongy rubber-like material having a substantially vertical planar face, said body having a plurality of substantially horizontal cavities therein intersecting said face and closed at their other ends, said face being provided with channels communicating with said cavities and extending outwardly through an edge of said face.

JOHN F. SCHOTT.